(12) United States Patent
Yamada et al.

(10) Patent No.: US 10,247,863 B2
(45) Date of Patent: Apr. 2, 2019

(54) ORGANIC PIGMENT COMPOSITION FOR COLOR FILTERS, METHOD FOR PRODUCING SAME, AND COLOR FILTER

(71) Applicant: DIC Corporation, Tokyo (JP)

(72) Inventors: Shogo Yamada, Sakura (JP); Ikuro Kiyoto, Sakura (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 15/564,892

(22) PCT Filed: Apr. 5, 2016

(86) PCT No.: PCT/JP2016/061098
§ 371 (c)(1),
(2) Date: Oct. 6, 2017

(87) PCT Pub. No.: WO2016/163351
PCT Pub. Date: Oct. 13, 2016

(65) Prior Publication Data
US 2018/0095205 A1 Apr. 5, 2018

(30) Foreign Application Priority Data

Apr. 7, 2015 (JP) .................................. 2015-078443
Jun. 15, 2015 (JP) .................................. 2015-120299

(51) Int. Cl.
| | | |
|---|---|---|
| C09B 47/04 | (2006.01) |
| C09B 47/12 | (2006.01) |
| C09B 67/04 | (2006.01) |
| C09B 67/16 | (2006.01) |
| C09B 67/20 | (2006.01) |
| C09B 67/50 | (2006.01) |
| G02B 5/20 | (2006.01) |
| G02B 5/22 | (2006.01) |
| C09B 67/12 | (2006.01) |
| C09B 67/00 | (2006.01) |

(52) U.S. Cl.
CPC .............. *G02B 5/223* (2013.01); *C09B 47/04* (2013.01); *C09B 67/0002* (2013.01); *C09B 67/0016* (2013.01); *C09B 67/0032* (2013.01); *G02B 5/20* (2013.01)

(58) Field of Classification Search
CPC ..... G02B 5/223; C09B 47/04; C09B 67/0002; C09B 67/0016; C09B 67/0032
See application file for complete search history.

(56) References Cited

FOREIGN PATENT DOCUMENTS

| | | | |
|---|---|---|---|
| JP | 2008-185703 A | 8/2008 | |
| JP | 2008-308605 | * 12/2008 | ............ C09B 67/20 |
| JP | 2008-308605 A | 12/2008 | |
| JP | 2012-032833 A | 2/2012 | |
| JP | 2012-036325 A | 2/2012 | |
| JP | 2013-60487 A | 4/2013 | |
| JP | 2013-203868 A | 10/2013 | |

OTHER PUBLICATIONS

International Search Report and Written Opinion dated Jun. 28, 2016, issued for PCT/JP2016/061098.

\* cited by examiner

*Primary Examiner* — Bijan Ahvazi
(74) *Attorney, Agent, or Firm* — Locke Lord LLP

(57) ABSTRACT

Provided is an organic pigment composition for color filters, which can be used preferably for a color filter that allows to produce a liquid crystal display device which has excellent heat resistance, a brighter display screen, and accordingly higher brightness; a method for producing the same; and a color filter which includes the organic pigment composition for color filters. The color filter has higher heat resistance by using the organic pigment composition for color filters which includes a phthalocyanine pigment and a pigment derivative in which the ratio of a multi-substituted phthalimide alkyl group to the whole amount of the pigment derivative is limited.

20 Claims, No Drawings

ORGANIC PIGMENT COMPOSITION FOR COLOR FILTERS, METHOD FOR PRODUCING SAME, AND COLOR FILTER

TECHNICAL FIELD

The present invention relates to an organic pigment composition for color filters which is preferably used for producing a color filter of a liquid crystal display device and includes a phthalocyanine pigment and a phthalocyanine pigment derivative, a method for producing the pigment composition for color filters, and a color filter which includes the pigment composition for color filters.

BACKGROUND ART

A color filter of a liquid crystal display device has a red pixel area, a green pixel area, and a blue pixel area. All of these pixel areas have a structure, in which a thin film made of a synthetic resin having an organic pigment dispersed therein is provided on a substrate, and as the organic pigment, organic pigments of each color including red, green, and blue are used.

Among these pixel areas, as a blue organic pigment for forming the blue pixel area, in general, an ε-type copper phthalocyanine pigment (C.I. pigment blue 15:6) is used, and if necessary, in order to mix colors, a small amount of a dioxazine violet pigment (C.I. pigment violet 23) of a violet organic pigment or a violet dye is used in combination.

The organic pigments used when producing a color filter are required to have properties which are totally different from the conventional organic pigments used for general purpose. Specifically, the organic pigments are required to cause a display screen of the liquid crystal display device to be brighter (increase brightness) or, in the same manner, to cause a display screen to be seen much clearly (increase contrast). Furthermore, since a color filter is exposed to the temperature of 200° C. or higher because of film attachment of transparent electrodes or alignment film attachment of polyimide in the step after producing a color filter, a pigment for color filters which has excellent heat resistance and satisfies the above-mentioned properties has been reviewed.

Meanwhile, a phthalocyanine pigment similar to the present invention is disclosed, for example, in the following documents.

PTL 1 discloses a method for producing a pigment composition which includes an ε-type phthalocyanine pigment and a phthalocyanine pigment derivative being substituted with a phthalimide methyl group with the number of the substituents being 1 to 4; however, a distribution of the substituents of the pigment derivative is not mentioned, and heat resistance is not sufficient to satisfy the heat resistance demanded in recent years.

In the same manner, PTL 2 and PTL 3 suggest a pigment composition for color filters which includes a fine ε-type copper phthalocyanine pigment and a phthalocyanine pigment derivative which has been substituted with a phthalimide methyl group with the number of the substituents being 1 to 4, and a method for producing the pigment composition by solvent salt milling. However, in the same manner as PTL 1, a distribution of the substituent of the pigment derivative is not mentioned and the inventions of PTL 2 and PTL 3 are insufficient for obtaining desired heat resistance.

However, when an organic pigment composition which includes a pigment derivative in which the ratio of a multi-substituted phthalimide alkyl group to the whole amount of the pigment derivative is specified as in the present invention and a phthalocyanine pigment is used for a color filter, brightness is less decreased and high heat resistance is obtained, even if the organic pigment composition undergoes a thermal history at high temperature in a step of producing a color filter.

CITATION LIST

Patent Literature

[PTL 1] JP-A-2013-203868
[PTL 2] JP-A-2008-185703
[PTL 3] JP-A-2008-308605

SUMMARY OF INVENTION

Technical Problem

The present invention relates to an organic pigment composition for color filters which causes brightness to be less decreased and which has excellent heat resistance, even if the organic pigment composition undergoes a thermal history at high temperature at the time of producing a color filter, a method for producing the same, and a color filter which includes the organic pigment composition for color filters used for the blue pixel area.

Solution to Problem

As a result of thorough study of the organic pigment composition for color filters which can be preferably used for the blue pixel area of a color filter, the present inventors have found that, in terms of a phthalocyanine pigment and a phthalimide alkyl group pigment derivative, a pigment derivative having the certain ratio of a multi-substituted phthalimide alkyl group pigment derivative is used; and accordingly, a color filter having higher heat resistance is provided, thereby completing the present invention.

That is, the present invention is as follows.

An organic pigment composition for color filters includes a phthalocyanine pigment (A) and a pigment derivative (B) represented by General Formula (1).

General Formula (1)

[Chem. 1]

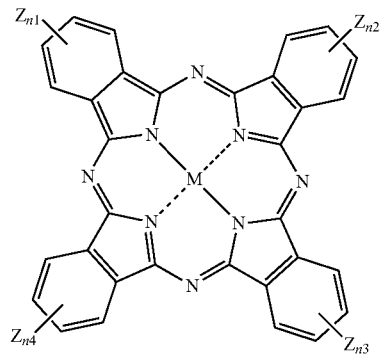

(In General Formula (1), M represents a metal which may have a substituent or 2H, Z represents a phthalimide alkyl group which may have a substituent, n1, n2, n3, and n4 represent the number of the substituent Z and each independently is an integer of 0 to 4, provided that when N=n1+n2+n3+n4, a relation of 1≤N≤8 is satisfied, and a sum of the strength ratio of pigment derivatives having an N of 3 to 8 in field desorption ionization mass spectrometry is 30% or less of a sum of the strength ratio of pigment derivatives having an N of 1 to 8.)

The organic pigment composition for color filters, in which, in General Formula (1), a sum of the strength ratio of pigment derivatives having an N of 4 to 8 in field desorption ionization mass spectrometry may be 15% or less of a sum of the strength ratio of pigment derivatives having an N of 1 to 8.

The organic pigment composition for color filters, in which M in General Formula (1) may represent a monovalent to tetravalent metal which may have a substituent.

The organic pigment composition for color filters, in which 0.1 parts to 50.0 parts of the pigment derivative (B) may be included per 100 parts of the phthalocyanine pigment (A) by mass.

A method for producing the organic pigment composition for color filters includes a step of performing solvent salt milling of a mixture which includes crude phthalocyanine or the phthalocyanine pigment (A), the pigment derivative (B) represented by General Formula (1), a water-soluble inorganic salt, and a water-soluble organic solvent.

The method for producing the organic pigment composition for color filters, in which the mixture, which includes crude phthalocyanine or the phthalocyanine pigment (A), the pigment derivative (B) represented by General Formula (1), a water-soluble inorganic salt, and a water-soluble organic solvent, may further include an acryl resin.

A color filter includes the above-mentioned organic pigment composition for color filters.

A color filter includes the organic pigment composition for color filters obtained by the above-mentioned method for producing an organic pigment composition for color filters.

Advantageous Effects of Invention

The pigment composition for color filters of the present invention is used for a color filter. Thus, a particularly remarkable technical effect is exhibited, in which a liquid crystal display device is obtained, whose brightness is less decreased even if the pigment composition undergoes a thermal history at high temperature at the time of producing a color filter, and which has excellent heat resistance, a brighter display screen, and accordingly higher brightness.

DESCRIPTION OF EMBODIMENTS

Hereinafter, the present invention will be described in detail.

The present invention relates to an organic pigment composition for color filters which includes a phthalocyanine pigment (A) and a pigment derivative (B) represented by General Formula (1) and a color filter which contains the pigment composition.

General Formula (1)

[Chem. 2]

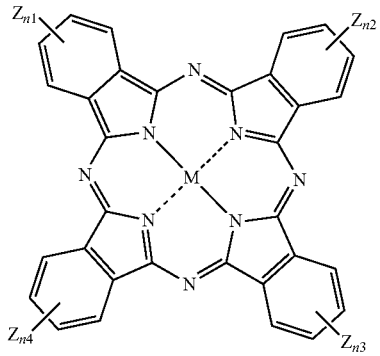

(In General Formula (1), M represents a metal which may have a substituent or 2H, Z represents a phthalimide alkyl group which may have a substituent, n1, n2, n3, and n4 represent the number of the substituent Z and each independently is an integer of 0 to 4, provided that when N=n1+n2+n3+n4, a relation of 1≤N≤8 is satisfied, and a sum of the strength ratio of pigment derivatives having an N of 3 to 8 in field desorption ionization mass spectrometry is 30% or less of a sum of the strength ratio of pigment derivatives having an N of 1 to 8.)

As the phthalocyanine pigment (A) used for the present invention, any pigment among phthalocyanine-based pigments having a phthalocyanine skeleton can be used. The phthalocyanine pigment is a pigment having high solidity and has a color phase from blue to green, and the phthalocyanine pigment is used in a wide range of purposes such as a color material, an electronic material, an ink jet, and a color filter. As a pigment used for the blue pixel area used for a color filter, normally, a well-known ε-type phthalocyanine pigment is preferably used. It is known that crystal polymorphism exists in the phthalocyanine pigment, such as α-type, β-type, γ-type, ε-type, δ-type, π-type, ρ-type, X-type, and R-type. However, as the pigment for color filters, an ε-type copper phthalocyanine pigment which has excellent heat resistance and a preferable color tone is preferred. As the ratio of an ε-type is higher, a pigment composition for color filters which has excellent heat resistance and a preferable color tone can be provided, and the ratio of an ε-type occupying in the crystal polymorphism is preferably 85% or more. As the ε-type phthalocyanine pigment, one or more ε-type phthalocyanine selected from ε-type copper phthalocyanine, ε-type zinc phthalocyanine, ε-type cobalt phthalocyanine, ε-type nickel phthalocyanine, and ε-type iron phthalocyanine can be exemplified, and as the ε-type phthalocyanine pigment to be used, one or two or more types thereof may be mixed. As a preferred ε-type phthalocyanine pigment, ε-type copper phthalocyanine can be exemplified from a viewpoint of a color tone.

Furthermore, as a pigment used for a green pixel area of a color filter, halogenated copper phthalocyanine or halogenated zinc phthalocyanine such as C.I. pigment green 7, C.I. pigment green 36, C.I. pigment green 58, and C.I. pigment green 59 is preferably used. In recent years, in order to achieve high color reproduction, a study has been actively conducted from a bluish green pigment to a yellowish green pigment and these halogenated phthalocyanines having different color phases can be used in the present invention as well. In the halogenated phthalocyanine, a difference in central metal makes a difference in a color phase, crystallinity, and heat resistance, and halogenated copper phthalocyanine, halogenated zinc phthalocyanine, and halogenated aluminum phthalocyanine are preferably used in a present situation.

The pigment derivative (B) used in the present invention is represented by the following general formula.

General Formula (1)

[Chem. 3]

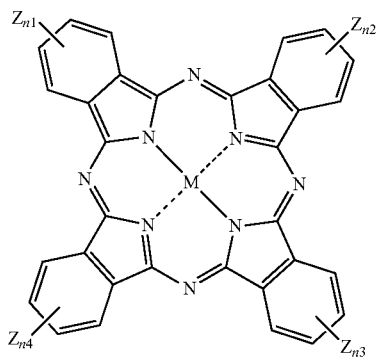

(In General Formula (1), M represents a metal which may have a substituent or 2H, Z represents a phthalimide alkyl group which may have a substituent, n1, n2, n3, and n4 represent the number of the substituent Z and each independently is an integer of 0 to 4, provided that when N=n1+n2+n3+n4, a relation of 1≤N≤8 is satisfied, and a sum of the strength ratio of pigment derivatives having an N of 3 to 8 in field desorption ionization mass spectrometry is 30% or less of a sum of the strength ratio of pigment derivatives having an N of 1 to 8.)

In General Formula (1), M represents a metal which may have a substituent or 2H, specifically, a monovalent metal such as Li, Na, and K, or a divalent to tetravalent metal such as Cu, Zn, Fe, Al, Co, Ti, and Pt, or 2H. In consideration of a synthesis method, yield, and cost as an industrial product, Cu, Zn, Al, and 2H are preferred as an industrial product which is generally introduced to a market. Among these, when combined with the phthalocyanine pigment, central metals which cause brightness to be decreased at least in the present invention, even if the pigment composition undergoes a thermal history, are Cu and Zn.

Next, in General Formula (1), the phthalimide alkyl group represented as Z is a pigment derivative in which a phthalimide alkyl group has been introduced into a benzene ring in the outline of a phthalocyanine skeleton. The phthalimide alkyl group is a substituent in which a phthalimide structure has been bonded to alkyl having 1 to 8 carbon atoms. The length of the alkyl group makes a difference in the effect of dispersibility of the pigment for color filters and affects optical properties such as contrast and brightness in a color filter. In the present invention, in consideration of dispersibility and optical properties, a phthalimide alkyl group having 1 to 8 carbon atoms is preferably used. Furthermore, a phthalimide methyl group of the alkyl group having 1 carbon atom is particularly preferable.

In addition, since four phthalimide alkyl groups can be introduced into each benzene ring in the outline, sixteen substitutions can be performed in maximum. In the prior art by now, by regulating the number of phthalimide alkyl group, a study for improving dispersibility, optical properties, and heat resistance of the pigment for color filters has been conducted. As a result of thorough study, the present inventors have found that, in a case where the ratio of the pigment derivative, which has the large number of substitutions of the phthalimide alkyl group, to the whole amount of the pigment derivative is greater, heat resistance becomes extremely deteriorated, and as a result, brightness after a thermal history is considerably decreased.

The thermal history in a color filter is performed by baking the pigment composition at the temperature of 200° or higher in fixation of the color filter itself and film formation of a polyimide alignment film, and temperature, time, and the number of baking may be further increased depending on the configuration of a display.

The number of phthalimide alkyl group substituted by phthalocyanine is measured by field desorption ionization mass spectrometry. In particular, when the substituent Z is a phthalimide methyl group, the number of substituents of the phthalimide methyl group at the molecular ion peak 159 (m/z) is set to an N of 1, the number of substituents is calculated from the strength ratio based on the ion peak, which is a multiple of the above molecular ion peak. As a result of calculation, in a case where a pigment derivative having a substituent as an N of 3 to 8 to the whole substituent numbers (N=1 to 8) 100% is 30% or less, it is clarified that the decreasing ratio of brightness after heat resistance history is low. In addition, it is determined that in a case where the pigment derivative is 25% or less, a decrease in brightness is even less, and in a case where the pigment derivative is 20% or less, a decrease in brightness is further less.

As the content of a pigment derivative of the phthalimide alkyl group having 3 to 8 substituents in the whole pigment derivatives is low, a decrease in brightness after thermal history is low. It is considered that the reason for the above is that a multi-substituted pigment derivative is likely to be decomposed by heat. Since the number of substitution of the multi-substituted pigment derivative is large, a molecular structure is unstable, which causes deterioration in heat resistance. Also, compatibility of the multi-substituted pigment derivative with a resin is increased. Furthermore, since the multi-substituted pigment derivative has a bulky molecular structure, intermolecular interaction such as π-π stacking between the pigment derivative and the phthalocyanine pigment is weak. Therefore, when the pigment composition undergoes a thermal history, the pigment derivative which has been treated to be a phthalocyanine pigment is effused to a resin component, a particle diameter of the pigment is enlarged, light scattering occurs, and brightness is decreased. Accordingly, it is considered that the organic pigment composition of the present invention in which the content of the multi-substituted pigment derivative is limited has high heat resistance.

The content of the pigment derivative (B) represented by General Formula (1) of the present invention in the organic pigment composition for color filters is preferably 0.1 to 50% by mass with respect to the phthalocyanine pigment (A), and more preferably 2 to 15% by mass from a viewpoint of change in a color phase and color purity affected by the content of the pigment derivative. If the content of the pigment derivative is less than 2% by mass, heat resistance of the pigment derivative caused by a crystal growth inhibiting effect cannot be expected, and if the content of the pigment derivative exceeds 15% by mass, influence on a blue color phase becomes greater, which is not preferable.

The organic pigment composition for color filters of the present invention can be obtained by performing solvent salt milling of a mixture, which includes crude phthalocyanine or the phthalocyanine pigment (A), the pigment derivative (B) represented by General Formula (1) of the present invention, a water-soluble inorganic salt, and water-soluble organic solvent. As an apparatus used for solvent salt milling, a kneader, a mix muller, Trimix (trade name) manufactured by INOUE MFG., INC., which is a planetary mixer disclosed in JP-A-2007-100008, or MIRACLE KCK manufactured by ASADA IRON WORKS CO., LTD., which is a continuous monoaxial kneader disclosed in JP-A-2006-306996, can be used.

The solvent salt milling means kneading and grinding of a pigment, an inorganic salt, and an organic solvent. Specifically, a pigment, an inorganic salt, and an organic solvent which does not dissolve thereof are put into a kneader, and kneading and grinding is performed in the kneader.

An acryl resin is further contained in the mixture which includes crude phthalocyanine or the phthalocyanine pigment (A), the pigment derivative (B) represented by General Formula (1) of the present invention, the water-soluble inorganic salt, and the water-soluble organic solvent. Thus, much preferred organic pigment composition for color filters can be obtained by solvent salt milling.

The water-soluble inorganic salt can be preferably used as the inorganic salt, and for example, an inorganic salt such as sodium chloride, potassium chloride, and sodium sulfate is preferably used. In addition, inorganic salt having an average particle diameter of 0.5 to 50 μm is more preferably used. These inorganic salts are easily obtained by finely pulverizing common inorganic salts.

The use amount of the inorganic salt is preferably set to 4 to 20 parts by weight and more preferably 6 to 15 parts by weight with respect to 1 part by weight of phthalocyanine.

As the organic solvent, a water-soluble organic solvent as the organic solvent which is able to inhibit crystal growth can be preferably used. For example, diethylene glycol, glycerine, ethylene glycol, propylene glycol, liquid polyethylene glycol, liquid polypropylene glycol, 2-(methoxymethoxy) ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, or dipropylene glycol can be used, and ethylene glycol or diethylene glycol is preferable.

The use amount of the water-soluble organic solvent is not particularly limited, and preferably 0.01 to 5 parts by weight with respect to 1 part by weight of the pigment.

As the acryl resin, a polymer of at least one or more (meth)acrylic acid ester monomers is used. In addition, a polymer may be used, in which one or more (meth)acrylic acid esters and other monomers which are copolymerizable with (meth)acrylic acid esters are used in combination.

As the (meth)acrylic acid alkyl ester monomer, for example, (meth)acrylic acid alkyl ester having an alkyl group such as methyl(meth)acrylate, ethyl(meth)acrylate, n-propyl(meth)acrylate, isopropyl(meth)acrylate, n-butyl (meth)acrylate, isobutyl(meth)acrylate, tert-butyl(meth) acrylate, 2-ethyl hexyl(meth)acrylate, n-octyl(meth)acrylate, dodecyl(meth)acrylate[lauryl(meth)acrylate], and octadecyl(meth)acrylate[stearyl(meth)acrylate], (meth) acrylic acid ester having a alicyclic group such as cyclohexyl(meth)acrylate, isobornyl(meth)acrylate, adamantyl (meth)acrylate, and dicyclopentanyl(meth)acrylate, which is (meth)acrylic acid alkyl ester; (meth)acrylic acid ester having an ether group such as methoxytriethylene glycol(meth) acrylate, methoxypolyethylene glycol#400(meth)acrylate, methoxydipropylene glycol(meth)acrylate, methoxytripropylene glycol(meth)acrylate, methoxypolypropylene glycol (meth)acrylate, ethyl carbitol(meth)acrylate, 2-ethyl hexyl carbitol(meth)acrylate, tetrahydrofurfuryl(meth)acrylate, phenoxyethyl(meth)acrylate, phenoxydiethylene glycol (meth)acrylate, p-nonyl phenoxyethyl(meth)acrylate, and p-nonyl phenoxypolyethylene glycol(meth)acrylate; and (meth)acrylic acid ester having an aromatic ring such as benzyl(meth)acrylate, can be used.

As other monomers which are copolymerizable with the (meth)acrylic acid ester monomer, for example, vinyl esters such as vinyl acetate, vinyl propionate, and tertiary vinyl carboxylate; heterocyclic vinyl compounds such as vinyl pyrrolidone; halogenated olefins such as vinyl chloride, vinylidene chloride, and vinylidene fluoride; cyano group-containing monomers such as acrylonitrile and methacrylonitrile; vinyl ethers such as ethyl vinyl ether and isobutyl vinyl ether; vinyl ketones such as methyl vinyl ketone; α-olefins such as ethylene and propylene; dienes such as butadiene and isoprene; and styrene-based monomers such as styrene, vinyl toluene, α-methyl styrene, dimethyl styrene, tert-butyl styrene, and chlorostyrene, can be used.

The use amount of the acryl resin is not particularly limited and preferably 0.01 to 1 parts by weight with respect to 1 part by weight of the pigment. In addition, if the use amount of the acryl resin is large, transparent components in the organic pigment composition for color filters are increased and coloring power is decreased. Thus, the use amount is more preferably 0.02 to 0.2 parts by weight.

Kneading is preferably performed at the temperature of 50° C. to 120° C. Even if kneading is performed at the temperature of less than 50° C., a percentage of ε conversion (ε-type crystallization ratio included in copper phthalocyanine) of the ε-type copper phthalocyanine is low, which is not preferable. Also, even if kneading is performed at the temperature exceeding 120° C., the size of pigment particles cannot be decreased sufficiently and contrast is decreased, which is not preferable as the organic pigment composition for color filters.

The organic pigment composition for color filters of the present invention may include free copper. The free copper to be included may be free copper remaining when copper phthalocyanine is synthesized or free copper generated by decomposition of the synthesized copper phthalocyanine. The free copper can be washed by acids. As the acids to be used, for example, hydrochloric acid and sulfuric acid can be exemplified, and concentration of the hydrochloric acid or sulfuric acid is preferably 0.5% to 4%. The temperature at the time of washing is preferably 50 to 90° C. Water may be used for washing. The preferable content of the free copper is 900 mass ppm or less in the pigment composition and in a case where the content is more than the above, heat resistance of the color filter to be obtained is decreased, which is not preferable.

In the organic pigment composition for color filters of the present invention, dispersibility to a liquid medium and dispersion stability are high, viscosity of a pigment dispersion described below is low, and Newtonian fluidity is high and stable from that the pigment composition is dispersed as fine particles. In a case where the blue pixel area of a color filter is produced, a uniform coating film is formed and accordingly, a color filter having high brightness, high contrast, and high light transmittance can be obtained. Here, the organic pigment composition for color filters of the present invention is characterized to include the phthalocyanine pigment (A) and the pigment derivative (B) represented by General Formula (1), and if necessary, even if the pigment composition includes a pigment for mixing colors such as a dioxazine-based pigment (C.I. pigment violet 23, C.I. pigment violet 37, C.I. pigment blue 80, or the like); an organic pigment derivative such as a sulfuric acid derivative of metal-free or metal phthalocyanine, a N-(dialkyl amino) methyl derivative of metal-free or metal phthalocyanine, a N-(dialkyl aminoalkyl)sulfonic acid amide derivative of metal-free or metal phthalocyanine, a sulfuric acid derivative of dioxazine violet, a sulfuric acid derivative of indanthrene blue, and phthalocyanine sulfuric acid; a dispersant such as DISPERBYK 130, DISPERBYK 161, DISPERBYK 162, DISPERBYK 163, DISPERBYK 170, DISPERBYK 171, DISPERBYK 174, DISPERBYK 180, DISPERBYK 182, DISPERBYK 183, DISPERBYK 184, DISPERBYK 185, DISPERBYK 2000, DISPERBYK 2001, DISPERBYK 2020, DISPERBYK 2050, DISPERBYK 2070, DISPERBYK 2096, and DISPERBYK 2150 of BYK Additives & Instruments, Efka 46, Efka 47, Efka 452, Efka LP4008, Efka 4009, Efka LP4010, Efka LP4050, LP4055, Efka 400, Efka 401, Efka 402, Efka 403, Efka 450, Efka 451, Efka 453, Efka 4540, Efka 4550, Efka LP4560, Efka 120, Efka 150, Efka 1501, Efka 1502, and Efka 1503 of Efka Chemicals, Solsperse 3000, Solsperse 9000, Solsperse 13240, Solsperse 13650, Solsperse 13940, Solsperse 17000, 18000, Solsperse 20000, Solsperse 21000, Solsperse 20000, Solsperse 24000, Solsperse 26000, Solsperse 27000, Solsperse 28000, Solsperse 32000, Solsperse 36000, Solsperse 37000, Solsperse 38000, Solsperse 41000, Solsperse 42000, Solsperse 43000, Solsperse 46000, Solsperse 54000, and Solsperse 71000 of Lubrizol Corporation, AJISPER PB711, AJISPER PB821, AJISPER PB822, AJISPER PB814, AJISPER PN411, and AJISPER PA111 of AJINOMOTO., INC.; and a resin including a natural rosin such as an acryl-based resin, an urethane-based resin, an alkyd-based resin, a wood rosin, a gum rosin, and a tall oil rosin, a modified rosin such as a polymerized rosin, a disproportionated rosin, a hydrogenated rosin, an oxidized rosin, and a maleated rosin, and a rosin derivative such as rosin amine, lime rosin, rosin alkylene oxide adducts, rosin alkyl adducts, and rosin-modified phenol, the pigment composition can be preferably used for the blue pixel area of a color filter. Addition of these organic pigment derivative, dispersant, and resin contributes to a decrease in flocculation, enhancement of dispersion stability of the pigment, and enhancement of viscosity of the dispersing element.

The organic pigment composition for color filters of the present invention can be preferably used, mainly for the blue pixel area of a color filter according to the conventionally well-known method. In addition, the organic pigment composition can be used for other red pixel area, green pixel area, and black matrix configuring a color filter, or for coloring a column spacer configuring a display. The use of the organic pigment composition for color filters of the present invention is not limited to the blue pixel area of a color filter.

Photolithography method is a representative method among the methods for dispersing the composition of the present invention. This method is performed such that a photocurable composition described below is coated on the surface on the side on which a black matrix of a transparent substrate for color filters is provided, heated, and dried (prebaked), and then the composition is irradiated with ultraviolet rays via a photomask to expose a pattern, a photocurable compound in the area corresponding to the pixel area is cured, and then an unexposed area is developed by a developing solution, and a non-pixel area is removed to fix the pixel area to the transparent substrate. According to this method, a pixel area including a cured colored film of the photocurable composition is formed on the transparent substrate. A photocurable composition described below is prepared for each red, green, and blue color and the above-mentioned operation is performed repetitively, thereby producing a color filter having pixel area colored by red, green, and blue on the predetermined positions.

As a pigment for forming a red pixel area, for example, C.I. pigment red 177, C.I. pigment red 209, C.I. pigment red 254, and the like are exemplified, and as a pigment for forming a green pixel area, for example, C.I. pigment green 7, C.I. pigment green 10, C.I. pigment green 36, C.I. pigment green 47, C.I. pigment green 58, C.I. pigment green 59, and the like are exemplified. A yellow pigment can be used in combination in order to form these red pixel area and green pixel area. Thereafter, if necessary, in order to thermally cure the unreacted photocurable compound, the whole color filter can be heated (post-baked).

A spin coating method, a roll coating method, an ink jet method, and the like are exemplified as a method for coating the photocurable composition described below on the transparent substrate such as a glass.

A drying condition of the coating film of the photocurable composition coated on the transparent substrate differs depending on the type of each component, a blending ratio, or the like, and normally, the temperature is 50° C. to 150° C. and the time is about 1 to 15 minutes. In addition, as the light used for photocuring of the photocurable composition, ultraviolet rays in the wavelength range of 200 to 500 nm or visible rays are preferably used. A variety of light sources emitting rays of this wavelength range can be used.

A puddle method, a dipping method, a spray method, or the like is exemplified as a developing method. The photocurable composition is exposed and developed and then the transparent substrate on which pixel areas with demanded colors are formed is washed by water and dried. The color filter obtained by this way is heated (post-baked) by a heating apparatus such as a hotplate and an oven at the temperature of 90° C. to 280° C. for a predetermined period of time, and accordingly volatile components in the colored coating film are removed and, at the same time, the unreacted photocurable compound remaining in the cured colored film of the photocurable composition is thermally cured, thereby completing a color filter.

The photocurable composition for forming a pixel area of a color filter essentially includes organic pigment composition for color filters of the present invention, a dispersant, a photocurable compound, and an organic solvent, and can be prepared by mixing these components using a thermoplastic resin according to the necessity. In a case where the colored resin film for forming a pixel area requires toughness demanded in order to endure baking, which is conducted for real production of a color filter, when preparing the photocurable composition, not only the photocurable compound but also this thermoplastic resin is inevitably used in combination. In a case where the thermoplastic resin is used in combination, an organic solvent which dissolves the thermoplastic resin is preferably used.

As a method for producing the photocurable composition, the method is general, in which the pigment composition of the present invention, an organic solvent, and a dispersant are essentially used, these components are mixed, stirred and dispersed so as to be uniform, and, firstly, after a pigment dispersion for forming a pixel area of a color filter is prepared, the photocurable compound and if necessary, the thermoplastic resin or a photopolymerization initiator are added to obtain the photocurable composition.

Here, the above-mentioned dispersant and the organic solvent can be used.

Examples of the thermoplastic resin used for preparing the photocurable composition include a urethane-based resin, an acryl-based resin, a polyamide-based resin, a polyimide-based resin, a styrene maleic acid-based resin, and a styrene maleic anhydride resin.

Examples of the photocurable compound include a bifunctional monomer such as 1,6-hexane diol diacrylate, ethylene glycol diacrylate, neopentyl glycol diacrylate, triethylene glycol diacrylate, bis(acryloxyethoxy)bisphenol A, and 3-methyl pentane diol diacrylate; a polyfunctional monomer having a relatively small molecular weight such as trimethylolpropanetriacrylate, pentaerythritol triacrylate, tris(2-hydroxyethyl)isocyanate, dipentaerythritol hexaacrylate, and dipentaerythritol pentaacrylate; a polyfunctional monomer having a relatively large molecular weight such as polyester acrylate, polyurethane acrylate, and polyether acrylate.

Examples of the photopolymerization initiator include acetophenone, benzophenone, benzyl dimethyl ketal, benzoyl peroxide, 2-chlorothioxanthone, 1,3-bis(4'-azido benzal)-2-propane, 1,3-bis(4'-azido benzal)-2-propane-2'-sulfonic acid, and 4,4'-diazido stilbene-2,2'-disulfonic acid. Examples of the commercially available photopolymerization initiator include "IRGACURE (trade name)-184", "IRGACURE (trade name)-369", and "DAROCUR (trade name)-1173" manufactured by Ciba Specialty Chemicals Corporation, "Lucirin-TPO" manufactured by BASF Japan Ltd., "Kayacure (trade name) DETX" and "Kayacure (trade name) OA" manufactured by Nippon Kayaku Co., Ltd., "Baikyua 10" and "Baikyua 55" manufactured by Sutoufa Chemical Co., "Trigonal PI" manufactured by Akzo Co., Ltd., "Sandorei 1000" manufactured by Sandozu Co., Ltd., "Deep" manufactured by Apujon Co., Ltd., and "Biimidazole" manufactured by Kurogane Kasei Co., Ltd.

A well-known and commonly used photosensitizer can be used in combination with the above-mentioned photopolymerization initiator. Examples of the photosensitizer include amines, ureas, a compound having a sulfur atom, a compound having a phosphorous atom, a compound having a chlorine atom, nitriles, or a compound having a nitrogen atom. These may be used alone or two or more thereof may be used in combination. A blending ratio of the photopolymerization initiator is not particularly limited, and preferably, by mass, in the range of 0.1% to 30% with respect to a compound having a photopolymerizable or photocurable functional group. If the blending ratio is less than 0.1%, photosensitivity at the time of photocuring tends to be decreased, and if the blending ratio exceeds 30%, when a coating film of a pigment-dispersed resist is dried, a crystal of the photopolymerization initiator is precipitated, which causes deterioration in physical properties of the coating film.

By using each material as described above, the pigment dispersion can be obtained by stirring and dispersing, by mass, 300 to 1000 parts of an organic solvent and 1 to 100 parts of a dispersant per 100 parts of the organic pigment composition for color filters of the present invention so as to be uniform. Next, total 0.5 to 20 parts of a thermoplastic resin and a photocurable compound per 1 part of the pigment composition of the present invention, 0.05 to 3 parts of a photopolymerization initiator per 1 part of the photocurable compound, and if necessary, an organic solvent are added to this pigment dispersion, and the resultant are stirred and dispersed so as to be uniform, thereby obtaining a photocurable composition for forming the blue pixel area of a color filter.

A well-known and commonly used organic solvent or an alkali aqueous solution can be used as a developing solution. In particular, a thermoplastic resin or a photocurable compound is included in the photocurable composition, and in a case where at least one of the above has an acid value and exhibits solubility in alkali, washing by an alkali aqueous solution is effective for forming a pixel area of a color filter.

Among the methods for dispersing a pigment, a method for producing a pixel area of a color filter according to a photolithography method is described in detail, and the pixel area of a color filter prepared by using the organic pigment composition for color filters of the present invention may be formed according to other methods such as an electrodeposition method, a transfer method, a micelle electrolytic method, a photovoltaic electrodeposition (PVED) method, an ink jet method, a reverse printing method, and a thermosetting method to produce a color filter.

A color filter can be obtained as follows: a photocurable composition of each color obtained by using a blue pigment, a red pigment, and a green pigment is used, a liquid crystal material is enclosed between a pair of transparent electrodes parallel to each other, the transparent electrodes are divided into discontinuous fine sections, and a colored pixel area of a color filter selected from any one color of red, green, and blue is alternatively provided in a pattern shape, to each of the fine sections divided in a grid shape by a black matrix on the transparent electrodes; or a colored pixel area of a color filter is formed on the substrate and then the transparent electrodes are provided.

An organic pigment dispersing element obtained from the organic pigment composition for color filters of the present invention is a pigment dispersing element having excellent clarity and brightness, and can be applied to, in addition to the use of a color filter, coloring a coating material, plastic (resin molded article), a printing ink, rubber, leather, textile printing, an electrostatic charge image developing toner, an ink jet recording ink, and a thermal transfer ink.

EXAMPLES

Hereinafter, the present invention is described in detail using Examples, and originally, the present invention is not limited to the range of Examples. In addition, all of "parts" and "%" are based on mass, unless otherwise mentioned.

In addition, the items described below in Synthesis Examples, Examples, and Comparative Examples are measured as follows.

(Measurement of Substituent Distribution of Pigment Derivative)

A substituent distribution of the pigment derivative was measured according to field desorption ionization mass spectrometry by using JMS-T100GC manufactured by JEOL Ltd. 5 mg of a sample was added to 1.0 mL of tetrahydrofuran which does not contain dibutyl hydroxytoluene and suspended by ultrasonic waves to be used for measurement.

[Measurement Condition]
Emitter current: 0 mA to 40 mA [25.6 mA/min]
Counter electrode: −10000 V
Measurement mass range: m/z=50 to 200
Measurement time: 2 minutes In the mass spectrometry obtained by field desorption ionization mass spectrometry, a sum of the molecular peak ionic strength of the pigment derivative having an N of 1 to 8 of the substituent Z is set to 100%, and the molecular peak ionic strength ratio of the pigment derivative having an N of 3 to 8 with respect to the molecular peak ionic strength of the pigment derivative having an N of 1 to 8 was calculated.

(Evaluation of Brightness Difference ΔY Before and after Baking)

By using a color filter before baking at the temperature of 230° C. and a color filter after baking at the temperature of 230° C., brightness Y of the chromaticity y=0.110 in the light source C was measured by MCPD-3000 (manufactured by OTSUKA ELECTRONICS Co., Ltd.). The brightness difference ΔY before and after baking was obtained by subtracting the brightness Y before baking from the brightness Y after baking. As the brightness difference ΔY is closer to 0, brightness is less decreased and heat resistance is excellent.

Synthesis Example 1 [Synthesis of Pigment Derivative (B-1)]

988 parts of 98% sulfuric acid (manufactured by NIPPON PHOSPHORIC ACID CO., JP) and 366 parts of 25% fuming sulfuric acid (manufactured by Wako Pure Chemical Industries, Ltd.) were put into a flask equipped with a stirrer, a thermometer, and a cooling tube, while being cooled in ice. After the temperature of the flask was increased to 30° C., 55 parts of phthalimide (manufactured by Wako Pure Chemical Industries, Ltd.) was added thereto and the temperature thereof was increased to 40° C. Thereafter, 20 parts of 92% paraformaldehyde (manufactured by MITSUBISHI GAS CHEMICAL COMPANY, INC.) was added thereto and stirred for 30 minutes. Next, 80 parts of a β-type copper phthalocyanine pigment (manufactured by DIC Corporation) was added thereto and stirred for 30 minutes. Subsequently, the temperature thereof was increased to 80° C. and stirred for 4 hours, and then the temperature was cooled down to room temperature. After cooling off, 7500 parts of water having room temperature was added thereto and stirred for 1 hour, and then a reaction solution was filtered. A filtrate was washed with water until the specific conductivity of the filtrate becomes not more than (the specific conductivity of the original water+50 μS/cm), thereby obtaining a wet cake of a pigment derivative. The obtained wet cake was dried at the temperature of 90° C. by blowing air for 24 hours to obtain a pigment derivative (B-1).

The pigment derivative (B-1) was analyzed according to field desorption ionization mass spectrometry and it was confirmed that the pigment derivative (B-1) is a compound in which M is a copper atom, a substituent Z is a phthalimide methyl group, and N=1 to 8 in General Formula (1). The result of field desorption ionization mass spectrometry is shown in Table 1.

TABLE 1

| Number of Substituent Z N | Result of Field Desorption Ionization Mass Spectrometry | | |
|---|---|---|---|
| | m/z | Molecular Ion Peak Strength Ratio | |
| 1 | 734 | 53.2% | |
| 2 | 893 | 20.3% | |
| 3 | 1052 | 13.5% | Total of N = 3 to 8: 26.5% |
| 4 | 1211 | 8.7% | |
| 5 | 1370 | 3.0% | |
| 6 | 1529 | 1.1% | |
| 7 | 1689 | 0.1% | |
| 8 | 1848 | 0.1% | |

Synthesis Example 2 [Synthesis of Pigment Derivative (B-2)]

485 parts of 98% sulfuric acid (manufactured by NIPPON PHOSPHORIC ACID CO., JP) and 170 parts of 25% fuming sulfuric acid (manufactured by Wako Pure Chemical Industries, Ltd.) were put into a flask equipped with a stirrer, a thermometer, and a cooling tube, while being cooled in ice. After the temperature of the flask was increased to 30° C., 38 parts of phthalimide (manufactured by Wako Pure Chemical Industries, Ltd.) was added thereto and the temperature thereof was increased to 40° C. Thereafter, 17 parts of 92% paraformaldehyde (manufactured by MITSUBISHI GAS CHEMICAL COMPANY, INC.) was added thereto and stirred for 30 minutes. Next, 110 parts of a β-type copper phthalocyanine pigment (manufactured by DIC Corporation) was added thereto and stirred for 30 minutes. Subsequently, the temperature thereof was increased to 80° C. and stirred for 4 hours, and then the temperature was cooled down to room temperature. After cooling off, 7500 parts of water having room temperature was added thereto and stirred for 1 hour, and then a reaction solution was filtered. A filtrate was washed with water until the specific conductivity of the filtrate becomes not more than (the specific conductivity of the original water+50 μS/cm), thereby obtaining a wet cake of a pigment derivative. The obtained wet cake was dried at the temperature of 90° C. by blowing air for 24 hours to obtain a pigment derivative (B-2).

The pigment derivative (B-2) was analyzed according to field desorption ionization mass spectrometry and it was confirmed that the pigment derivative (B-2) is a compound in which M is a copper atom, a substituent Z is a phthalimide methyl group, and N=1 to 8 in General Formula (1). The result of field desorption ionization mass spectrometry is shown in Table 2.

TABLE 2

| Number of Substituent Z N | Result of Field Desorption Ionization Mass Spectrometry | | |
|---|---|---|---|
| | m/z | Molecular Ion Peak Strength Ratio | |
| 1 | 734 | 57.4% | |
| 2 | 893 | 21.4% | |
| 3 | 1052 | 12.9% | Total of N = 3 to 8: 21.2% |
| 4 | 1211 | 6.2% | |
| 5 | 1370 | 1.4% | |
| 6 | 1529 | 0.5% | |
| 7 | 1689 | 0.1% | |
| 8 | 1848 | 0.1% | |

Synthesis Example 3 [Synthesis of Pigment Derivative (B-3)]

520 parts of 98% sulfuric acid (manufactured by NIPPON PHOSPHORIC ACID CO., JP) and 170 parts of 25% fuming sulfuric acid (manufactured by Wako Pure Chemical Industries, Ltd.) were put into a flask equipped with a stirrer, a thermometer, and a cooling tube, while being cooled in ice. After the temperature of the flask was increased to 30° C., 26 parts of phthalimide (manufactured by Wako Pure Chemical Industries, Ltd.) was added thereto and the temperature thereof was increased to 40° C. Thereafter, 10 parts of 92% paraformaldehyde (manufactured by MITSUBISHI GAS CHEMICAL COMPANY, INC.) was added thereto and stirred for 30 minutes. Next, 118 parts of a β-type copper phthalocyanine pigment (manufactured by DIC Corporation) was added thereto and stirred for 30 minutes. Subsequently, the temperature thereof was increased to 80° C. and stirred for 4 hours, and then the temperature was cooled down to room temperature. After cooling off, 7500 parts of water having room temperature was added thereto and stirred for 1 hour, and then a reaction solution was filtered. A filtrate was washed with water until the specific conductivity of the filtrate becomes not more than (the specific conductivity of the original water+50 µS/cm), thereby obtaining a wet cake of a pigment derivative. The obtained wet cake was dried at the temperature of 90° C. by blowing air for 24 hours to obtain a pigment derivative (B-3).

The pigment derivative (B-3) was analyzed according to field desorption ionization mass spectrometry and it was confirmed that the pigment derivative (B-3) is a compound in which M is a copper atom, a substituent Z is a phthalimide methyl group, and N=1 to 8 in General Formula (1). The result of field desorption ionization mass spectrometry is shown in Table 3.

TABLE 3

| Number of Substituent Z N | Result of Field Desorption Ionization Mass Spectrometry | | |
|---|---|---|---|
| | m/z | Molecular Ion Peak Strength Ratio | |
| 1 | 734 | 59.7% | |
| 2 | 893 | 22.7% | |
| 3 | 1052 | 12.2% | Total of N = 3 |
| 4 | 1211 | 4.5% | to 8: 17.6% |
| 5 | 1370 | 0.7% | |
| 6 | 1529 | 0.2% | |
| 7 | 1689 | 0.1% | |
| 8 | 1848 | 0.1% | |

Synthesis Example 4 [Synthesis of Pigment Derivative (B-4)]

988 parts of 98% sulfuric acid (manufactured by NIPPON PHOSPHORIC ACID CO., JP) and 366 parts of 25% fuming sulfuric acid (manufactured by Wako Pure Chemical Industries, Ltd.) were put into a flask equipped with a stirrer, a thermometer, and a cooling tube, while being cooled in ice. After the temperature of the flask was increased to 30° C., 55 parts of phthalimide (manufactured by Wako Pure Chemical Industries, Ltd.) was added thereto and the temperature thereof was increased to 40° C. Thereafter, 20 parts of 92% paraformaldehyde (manufactured by MITSUBISHI GAS CHEMICAL COMPANY, INC.) was added thereto and stirred for 30 minutes. Next, 81 parts of a zinc phthalocyanine pigment (manufactured by DIC Corporation) was added thereto and stirred for 30 minutes. Subsequently, the temperature thereof was increased to 70° C. and stirred for 4 hours, and then the temperature was cooled down to room temperature. After cooling off, 7500 parts of water having room temperature was added thereto and stirred for 1 hour, and then a reaction solution was filtered. A filtrate was washed with water until the specific conductivity of the filtrate becomes not more than (the specific conductivity of the original water+50 µS/cm), thereby obtaining a wet cake of a pigment derivative. The obtained wet cake was dried at the temperature of 90° C. by blowing air for 24 hours to obtain a pigment derivative (B-4).

The pigment derivative (B-4) was analyzed according to field desorption ionization mass spectrometry and it was confirmed that the pigment derivative (B-4) is a compound in which M is a zinc atom, a substituent Z is a phthalimide methyl group, and N=1 to 8 in General Formula (1). The result of field desorption ionization mass spectrometry is shown in Table 4.

TABLE 4

| Number of Substituent Z N | Result of Field Desorption Ionization Mass Spectrometry | | |
|---|---|---|---|
| | m/z | Molecular Ion Peak Strength Ratio | |
| 1 | 735 | 53.5% | |
| 2 | 894 | 21.3% | |
| 3 | 1053 | 12.8% | Total of N = 3 |
| 4 | 1212 | 8.5% | to 8: 25.2% |
| 5 | 1371 | 3.2% | |
| 6 | 1530 | 0.5% | |
| 7 | 1690 | 0.1% | |
| 8 | 1849 | 0.1% | |

Synthesis Example 5 [Synthesis of Pigment Derivative (B-5)]

520 parts of 98% sulfuric acid (manufactured by NIPPON PHOSPHORIC ACID CO., JP) and 170 parts of 25% fuming sulfuric acid (manufactured by Wako Pure Chemical Industries, Ltd.) were put into a flask equipped with a stirrer, a thermometer, and a cooling tube, while being cooled in ice. After the temperature of the flask was increased to 30° C., 25 parts of phthalimide (manufactured by Wako Pure Chemical Industries, Ltd.) was added thereto and the temperature thereof was increased to 40° C. Thereafter, 10 parts of 92% paraformaldehyde (manufactured by MITSUBISHI GAS CHEMICAL COMPANY, INC.) was added thereto and stirred for 30 minutes. Next, 125 parts of a zinc phthalocyanine pigment (manufactured by DIC Corporation) was added thereto and stirred for 30 minutes. Subsequently, the temperature thereof was increased to 70° C. and stirred for 4 hours, and then the temperature was cooled down to room temperature. After cooling off, 7500 parts of water having room temperature was added thereto and stirred for 1 hour, and then a reaction solution was filtered. A filtrate was washed with water until the specific conductivity of the filtrate becomes not more than (the specific conductivity of the original water+50 µS/cm), thereby obtaining a wet cake of a pigment derivative. The obtained wet cake was dried at the temperature of 90° C. by blowing air for 24 hours to obtain a pigment derivative (B-5).

The pigment derivative (B-5) was analyzed according to field desorption ionization mass spectrometry and it was confirmed that the pigment derivative (B-5) is a compound in which M is a zinc atom, a substituent Z is a phthalimide methyl group, and N=1 to 8 in General Formula (1). The result of field desorption ionization mass spectrometry is shown in Table 5.

TABLE 5

| Number of Substituent Z N | Result of Field Desorption Ionization Mass Spectrometry | |
|---|---|---|
| | m/z | Molecular Ion Peak Strength Ratio |
| 1 | 735 | 63.1% |
| 2 | 894 | 20.5% |

TABLE 5-continued

| Number of Substituent Z N | Result of Field Desorption Ionization Mass Spectrometry | |  |
|---|---|---|---|
|  | m/z | Molecular Ion Peak Strength Ratio |  |
| 3 | 1053 | 10.7% | Total of N = 3 |
| 4 | 1212 | 4.2% | to 8: 16.4% |
| 5 | 1371 | 1.1% |  |
| 6 | 1530 | 0.3% |  |
| 7 | 1690 | 0.1% |  |
| 8 | 1849 | 0.0% |  |

Synthesis Example 6 [Synthesis of Comparative Pigment Derivative (B'-1)]

913 parts of 98% sulfuric acid (manufactured by NIPPON PHOSPHORIC ACID CO., JP) and 366 parts of 25% fuming sulfuric acid (manufactured by Wako Pure Chemical Industries, Ltd.) were put into a flask equipped with a stirrer, a thermometer, and a cooling tube, while being cooled in ice. After the temperature of the flask was increased to 30° C., 70 parts of phthalimide (manufactured by Wako Pure Chemical Industries, Ltd.) was added thereto and the temperature thereof was increased to 40° C. Thereafter, 28 parts of 92% paraformaldehyde (manufactured by MITSUBISHI GAS CHEMICAL COMPANY, INC.) was added thereto and stirred for 30 minutes. Next, 80 parts of a β-type copper phthalocyanine pigment (manufactured by DIC Corporation) was added thereto and stirred for 30 minutes. Subsequently, the temperature thereof was increased to 80° C. and stirred for 4 hours, and then the temperature was cooled down to room temperature. After cooling off, 7500 parts of water having room temperature was added thereto and stirred for 1 hour, and then a reaction solution was filtered. A filtrate was washed with water until the specific conductivity of the filtrate becomes not more than (the specific conductivity of the original water+50 μS/cm), thereby obtaining a wet cake of a pigment derivative. The obtained wet cake was dried at the temperature of 90° C. by blowing air for 24 hours to obtain a comparative pigment derivative (B'-1).

The comparative pigment derivative (B'-1) was analyzed according to field desorption ionization mass spectrometry and it was confirmed that the comparative pigment derivative (B'-1) is a compound in which M is a copper atom, a substituent Z is a phthalimide methyl group, and N=1 to 8 in General Formula (1). The result of field desorption ionization mass spectrometry is shown in Table 6.

TABLE 6

| Number of Substituent Z N | Result of Field Desorption Ionization Mass Spectrometry | |  |
|---|---|---|---|
|  | m/z | Molecular Ion Peak Strength Ratio |  |
| 1 | 734 | 49.3% |  |
| 2 | 893 | 19.7% |  |
| 3 | 1052 | 13.2% | Total of N = 3 |
| 4 | 1211 | 10.7% | to 8: 31.0% |
| 5 | 1370 | 5.2% |  |
| 6 | 1529 | 1.8% |  |
| 7 | 1689 | 0.0% |  |
| 8 | 1848 | 0.1% |  |

Synthesis Example 7 [Synthesis of Comparative Pigment Derivative (B'-2)]

913 parts of 98% sulfuric acid (manufactured by NIPPON PHOSPHORIC ACID CO., JP) and 366 parts of 25% fuming sulfuric acid (manufactured by Wako Pure Chemical Industries, Ltd.) were put into a flask equipped with a stirrer, a thermometer, and a cooling tube, while being cooled in ice. After the temperature of the flask was increased to 30° C., 70 parts of phthalimide (manufactured by Wako Pure Chemical Industries, Ltd.) was added thereto and the temperature thereof was increased to 40° C. Thereafter, 28 parts of 92% paraformaldehyde (manufactured by MITSUBISHI GAS CHEMICAL COMPANY, INC.) was added thereto and stirred for 30 minutes. Next, 81 parts of a zinc phthalocyanine pigment (manufactured by DIC Corporation) was added thereto and stirred for 30 minutes. Subsequently, the temperature thereof was increased to 70° C. and stirred for 4 hours, and then the temperature was cooled down to room temperature. After cooling off, 7500 parts of water having room temperature was added thereto and stirred for 1 hour, and then a reaction solution was filtered. A filtrate was washed with water until the specific conductivity of the filtrate becomes not more than (the specific conductivity of the original water+50 μS/cm), thereby obtaining a wet cake of a pigment derivative. The obtained wet cake was dried at the temperature of 90° C. by blowing air for 24 hours to obtain a comparative pigment derivative (B'-2).

The comparative pigment derivative (B'-2) was analyzed according to field desorption ionization mass spectrometry and it was confirmed that the comparative pigment derivative (B'-2) is a compound in which M is a zinc atom, a substituent Z is a phthalimide methyl group, and N=1 to 8 in General Formula (1). The result of field desorption ionization mass spectrometry is shown in Table 7.

TABLE 7

| Number of Substituent Z N | Result of Field Desorption Ionization Mass Spectrometry | |  |
|---|---|---|---|
|  | m/z | Molecular Ion Peak Strength Ratio |  |
| 1 | 735 | 48.0% |  |
| 2 | 894 | 19.0% |  |
| 3 | 1053 | 14.9% | Total of N = 3 |
| 4 | 1212 | 11.4% | to 8: 33.1% |
| 5 | 1371 | 5.0% |  |
| 6 | 1530 | 1.4% |  |
| 7 | 1690 | 0.3% |  |
| 8 | 1849 | 0.1% |  |

Preparation Example 1 [Preparation of Crude Phthalocyanine (C-1)]

270 parts of FASTOGEN Blue RF (α-type copper phthalocyanine pigment manufactured by DIC Corporation), 15 parts of FASTOGEN Blue AE-8 (ε-type copper phthalocyanine pigment manufactured by DIC Corporation), 15 parts of the pigment derivative (B-1), 2400 parts of pulverized sodium chloride (manufactured by Nihonshokuenseizo Co., Ltd.), and 450 parts of diethylene glycol (manufactured by Mitsubishi Chemical Corporation) were put into a double arm kneader (manufactured by INOUE MFG, INC.), and kneaded at the temperature of 120° C. to 130° C. for 6 hours. The obtained contents were washed with an excessive amount of water, filtered, and washed with water until the specific conductivity of the filtrate becomes not more than (the specific conductivity of the original water+50 μS/cm), thereby obtaining a wet cake of the ε-type copper phthalocyanine pigment. The wet cake was dried at the temperature of 90° C. by blowing air for 24 hours to obtain crude phthalocyanine (C-1).

Preparation Example 2 [Preparation of Crude Phthalocyanine (C-2)]

270 parts of FASTOGEN Blue RF (α-type copper phthalocyanine pigment manufactured by DIC Corporation), 15 parts of FASTOGEN Blue AE-8 (ε-type copper phthalocyanine pigment manufactured by DIC Corporation), 15 parts of the pigment derivative (B-3), 2400 parts of pulverized sodium chloride (manufactured by Nihonshokuenseizo Co., Ltd.), and 450 parts of diethylene glycol (manufactured by Mitsubishi Chemical Corporation) were put into a double arm kneader (manufactured by INOUE MFG, INC.), and kneaded at the temperature of 120° C. to 130° C. for 6 hours. The obtained contents were washed with an excessive amount of water, filtered, and washed with water until the specific conductivity of the filtrate becomes not more than (the specific conductivity of the original water+50 μS/cm), thereby obtaining a wet cake of the ε-type copper phthalocyanine pigment. The wet cake was dried at the temperature of 90° C. by blowing air for 24 hours to obtain crude phthalocyanine (C-2).

Preparation Example 3 [Preparation of Crude Phthalocyanine (C-3)]

270 parts of FASTOGEN Blue RF (α-type copper phthalocyanine pigment manufactured by DIC Corporation), 15 parts of FASTOGEN Blue AE-8 (ε-type copper phthalocyanine pigment manufactured by DIC Corporation), 15 parts of the comparative pigment derivative (B'-1), 2400 parts of pulverized sodium chloride (manufactured by Nihonshokuenseizo Co., Ltd.), and 450 parts of diethylene glycol (manufactured by Mitsubishi Chemical Corporation) were put into a double arm kneader (manufactured by INOUE MFG, INC.), and kneaded at the temperature of 120° C. to 130° C. for 6 hours. The obtained contents were washed with an excessive amount of water, filtered, and washed with water until the specific conductivity of the filtrate becomes not more than (the specific conductivity of the original water+50 μS/cm), thereby obtaining a wet cake of the ε-type copper phthalocyanine pigment. The wet cake was dried at the temperature of 90° C. by blowing air for 24 hours to obtain crude phthalocyanine (C-3).

Example 1

85 parts of the crude phthalocyanine (C-1), 5 parts of the pigment derivative (B-1), 10 parts of the polymer (B-5) disclosed in JP-A-2013-228714 as an acryl resin, and 1000 parts of pulverized sodium chloride (manufactured by Nihonshokuenseizo Co., Ltd.), and 160 parts of diethylene glycol (manufactured by Mitsubishi Chemical Corporation) were put into a double arm kneader (manufactured by INOUE MFG, INC.) and kneaded at the temperature of 80° C. to 90° C. for 12 hours. The obtained contents were washed with an excessive amount of water, filtered, and washed with water until the specific conductivity of the filtrate becomes not more than (the specific conductivity of the original water+20 μS/cm), thereby obtaining a wet cake. The obtained wet cake was moved to a beaker, 3000 parts of 2% aqueous hydrochloric acid (manufactured by DAIKIN INDUSTRIES, LTD.) was added thereto, the resultant was stirred and dispersed to obtain a slurry, and the slurry was stirred at the temperature of 70° C. for 1 hour, and then the slurry was filtered and washed to obtain a wet cake. The obtained wet cake was moved to a beaker, 3000 parts of water having room temperature was added thereto, and the resultant was stirred and dispersed to obtain a slurry. Subsequently, a sodium hydroxide (manufactured by Wako Pure Chemical Industries, Ltd.) aqueous solution of 5 parts of the copper phthalocyanine sulfonic acid derivative (manufactured by DIC Corporation) having an average substituent number of 0.8 was added to the pigment slurry and stirred for 1 hour, and then hydrochloric acid (manufactured by DAIKIN INDUSTRIES, LTD.) was added thereto to return the pH of the slurry to 7, and the copper phthalocyanine sulfonic acid derivative was made to be precipitated on the surface of the pigment. The resultant was kept for 1 hour as it is, and then filtered, washed with warm water, dried, and pulverized, thereby obtaining a blue organic pigment composition (D-1).

20 parts of the blue organic pigment composition (D-1) obtained as the above was put into a polyethylene bottle, 110 parts of propylene glycol monomethylether acetate (manufactured by DAICEL Corporation), 14 parts of DISPERBYK LPN21116 (manufactured by BYK Additives & Instruments), and 0.3 to 0.4 mmφ SEPR beads (manufactured by Saint-Gobain K.K.) were added thereto, and the resultant was dispersed by a paint conditioner (manufactured by TOYO SEIKI Co., Ltd.) for 4 hours, thereby obtaining a pigment dispersion. 75.00 parts of the pigment dispersion, 5.50 parts of a polyester acrylate resin (ARONIX M7100, manufactured by TOAGOSEI CO., LTD.), 5.00 parts of dipentaerythritol hexaacrylate (KAYARAD DPHA, manufactured by Nippon Kayaku Co., Ltd.), 1.00 part of benzophenone (KAYACURE BP-100, manufactured by Nippon Kayaku Co., Ltd.), and 13.5 parts of UCAR ester EFP (manufactured by The Dow Chemical Company) were stirred by a dispersing stirrer and filtered by a filter having a pore size of 1.0 μm, thereby obtaining a color resist. The color resist was coated on a 1 mm glass substrate having a size of 50 mm×50 mm by a spin coater and preliminarily dried at the temperature of 90° C. for 20 minutes, thereby forming a coating film. Next, a pattern exposure was performed with ultraviolet rays via a photomask, the unexposed area was washed in a 0.5% sodium carbonate (manufactured by Wako Pure Chemical Industries, Ltd.) aqueous solution, and baking was performed at the temperature of 230° C. for 60 minutes, thereby obtaining a color filter.

With respect to the color filter obtained in Example 1, brightness difference ΔY before and after baking at the temperature of 230° C. was measured by MCPD-3000 (manufactured by OTSUKA ELECTRONICS Co., LTD.), and the ΔY was −0.04.

Example 2

The same was performed as Example 1 except that crude phthalocyanine (C-2) was used instead of the crude phthalocyanine (C-1) of Example 1, thereby obtaining a blue organic pigment composition (D-2). A color filter was obtained by using this composition, brightness difference ΔY before and after baking at the temperature of 230° C. was measured by MCPD-3000 (manufactured by OTSUKA ELECTRONICS Co., LTD.), and the ΔY was −0.03.

Example 3

The same was performed as Example 1 except that crude phthalocyanine (C-3) was used instead of the crude phthalocyanine (C-1) of Example 1 and the pigment derivative (B-1) was used instead of the pigment derivative (B-3), thereby obtaining a blue organic pigment composition (D-3). A color filter was obtained by using this composition, brightness difference ΔY before and after baking at the temperature of 230° C. was measured by MCPD-3000 (manufactured by OTSUKA ELECTRONICS Co., LTD.), and the ΔY was −0.06.

Example 4

The same was performed as Example 1 except that crude phthalocyanine (C-3) was used instead of the crude phthalocyanine (C-1) of Example 1 and the pigment derivative (B-2) was used instead of the pigment derivative (B-3), thereby obtaining a blue organic pigment composition (D-4). A color filter was obtained by using this composition, brightness difference ΔY before and after baking at the temperature of 230° C. was measured by MCPD-3000 (manufactured by OTSUKA ELECTRONICS Co., LTD.), and the ΔY was −0.07.

Example 5

The same was performed as Example 1 except that crude phthalocyanine (C-3) was used instead of the crude phthalocyanine (C-1) of Example 1, thereby obtaining a blue organic pigment composition (D-5). A color filter was obtained by using this composition, brightness difference ΔY before and after baking at the temperature of 230° C. was measured by MCPD-3000 (manufactured by OTSUKA ELECTRONICS Co., LTD.), and the ΔY was −0.08.

Example 6

The same was performed as Example 1 except that the comparative pigment derivative (B'-1) was used instead of the pigment derivative (B-3) of Example 1, thereby obtaining a blue organic pigment composition (D-6). A color filter was obtained by using this composition, brightness difference ΔY before and after baking at the temperature of 230° C. was measured by MCPD-3000 (manufactured by OTSUKA ELECTRONICS Co., LTD.), and the ΔY was −0.14.

Example 7

The same was performed as Example 1 except that crude phthalocyanine (C-2) was used instead of the crude phthalocyanine (C-1) of Example 1 and the comparative pigment derivative (B'-1) was used instead of the pigment derivative (B-3), thereby obtaining a blue organic pigment composition (D-7). A color filter was obtained by using this composition, brightness difference ΔY before and after baking at the temperature of 230° C. was measured by MCPD-3000 (manufactured by OTSUKA ELECTRONICS Co., LTD.), and the ΔY was −0.13.

Example 8

The same was performed as Example 1 except that crude phthalocyanine (C-2) was used instead of the crude phthalocyanine (C-1) of Example 1 and the pigment derivative (B-4) was used instead of the pigment derivative (B-3), thereby obtaining a blue organic pigment composition (D-8). A color filter was obtained by using this composition, brightness difference ΔY before and after baking at the temperature of 230° C. was measured by MCPD-3000 (manufactured by OTSUKA ELECTRONICS Co., LTD.), and the ΔY was −0.08.

Example 9

The same was performed as Example 1 except that crude phthalocyanine (C-2) was used instead of the crude phthalocyanine (C-1) of Example 1 and the pigment derivative (B-5) was used instead of the pigment derivative (B-3), thereby obtaining a blue organic pigment composition (D-9). A color filter was obtained by using this composition, brightness difference ΔY before and after baking at the temperature of 230° C. was measured by MCPD-3000 (manufactured by OTSUKA ELECTRONICS Co., LTD.), and the ΔY was −0.05.

Comparative Example 1

The same was performed as Example 1 except that crude phthalocyanine (C-3) was used instead of the crude phthalocyanine (C-1) of Example 1 and the comparative pigment derivative (B'-1) was used instead of the pigment derivative (B-3), thereby obtaining a comparative blue organic pigment composition (D'-1). A color filter was obtained by using this composition, brightness difference ΔY before and after baking at the temperature of 230° C. was measured by MCPD-3000 (manufactured by OTSUKA ELECTRONICS Co., LTD.), and the ΔY was −0.18.

Comparative Example 2

The same was performed as Example 1 except that crude phthalocyanine (C-3) was used instead of the crude phthalocyanine (C-1) of Example 1 and the comparative pigment derivative (B'-2) was used instead of the pigment derivative (B-3), thereby obtaining a comparative blue organic pigment composition (D'-2). A color filter was obtained by using this composition, brightness difference ΔY before and after baking at the temperature of 230° C. was measured by MCPD-3000 (manufactured by OTSUKA ELECTRONICS Co., LTD.), and the ΔY was −0.20.

A summary of the above-mentioned Synthesis Examples 1 to 7 is shown in Table 8 and evaluation results of Examples 1 to 9 and Comparative Examples 1 and 2 are shown in Table 9.

TABLE 8

| | Pigment Derivative (B) | Central Metal M | Sum of Strength ratio of N = 3 to 8 |
|---|---|---|---|
| Synthesis Example 1 | Pigment Derivative (B-1) | Copper | 26.50% |
| Synthesis Example 2 | Pigment Derivative (B-2) | Copper | 21.20% |
| Synthesis Example 3 | Pigment Derivative (B-3) | Copper | 17.60% |
| Synthesis Example 4 | Pigment Derivative (B-4) | Zinc | 25.20% |
| Synthesis Example 5 | Pigment Derivative (B-5) | Zinc | 16.40% |
| Synthesis Example 6 | Comparative Pigment Derivative (B'-1) | Copper | 31.00% |
| Synthesis Example 7 | Comparative Pigment Derivative (B'-2) | Zinc | 33.10% |

TABLE 9

| | Crude Phthalocyanine (C) | Pigment Derivative (B) in Crude Phthalocyanine (C) | Pigment Derivative (B) used in Examples | Blue Organic Pigment Composition (D) | Brightness Difference ΔY before and after baking |
|---|---|---|---|---|---|
| Example 1 | Crude Phthalocyanine (C-1) | Pigment Derivative (B-1) | Pigment Derivative (B-3) | Blue Organic Pigment Composition (D-1) | −0.04 |
| Example 2 | Crude Phthalocyanine (C-2) | Pigment Derivative (B-3) | Pigment Derivative (B-3) | Blue Organic Pigment Composition (D-2) | −0.03 |
| Example 3 | Crude Phthalocyanine (C-3) | Comparative Pigment Derivative (B'-1) | Pigment Derivative (B-1) | Blue Organic Pigment Composition (D-3) | −0.06 |
| Example 4 | Crude Phthalocyanine (C-3) | Comparative Pigment Derivative (B'-1) | Pigment Derivative (B-2) | Blue Organic Pigment Composition (D-4) | −0.07 |
| Example 5 | Crude Phthalocyanine (C-3) | Comparative Pigment Derivative (B'-1) | Pigment Derivative (B-3) | Blue Organic Pigment Composition (D-5) | −0.08 |
| Example 6 | Crude Phthalocyanine (C-1) | Pigment Derivative (B-1) | Comparative Pigment Derivative (B'-1) | Blue Organic Pigment Composition (D-6) | −0.13 |
| Example 7 | Crude Phthalocyanine (C-2) | Pigment Derivative (B-3) | Comparative Pigment Derivative (B'-1) | Blue Organic Pigment Composition (D-7) | −0.12 |
| Comparative Example 1 | Crude Phthalocyanine (C-3) | Comparative Pigment Derivative (B'-1) | Comparative Pigment Derivative (B'-1) | Comparative Blue Organic Pigment Composition (D'-1) | −0.18 |
| Example 8 | Crude Phthalocyanine (C-2) | Pigment Derivative (B-3) | Pigment Derivative (B-4) | Blue Organic Pigment Composition (D-8) | −0.08 |
| Example 9 | Crude Phthalocyanine (C-2) | Pigment Derivative (B-3) | Pigment Derivative (B-5) | Blue Organic Pigment Composition (D-9) | −0.05 |
| Comparative Example 2 | Crude Phthalocyanine (C-3) | Comparative Pigment Derivative (B'-1) | Comparative Pigment Derivative (B'-2) | Comparative Blue Organic Pigment Composition (D'-2) | −0.2 |

As understood from comparison between Examples 1 to 7 and Comparative Example 1 shown in the above Table 9 and comparison between Examples 8 and 9 and Comparative Example 2, if the pigment derivative (B), in which a sum of the strength ratio of the pigment derivative having an N of 3 to 8 in field desorption ionization mass spectrometry is 30% or less of a sum of the strength ratio of pigment derivatives having an N of 1 to 8, is used, it is apparent to obtain an organic pigment composition whose brightness difference ΔY before and after baking is remarkably small and heat resistance is extremely high. In addition, in the pigment derivative used when preparing an ε-type copper phthalocyanine from an α-type copper phthalocyanine pigment and the pigment derivative used when synthesizing a blue organic pigment composition from the ε-type copper phthalocyanine, the above-mentioned both pigment derivatives may be the pigment derivative (B) in which a sum of strength ratio of the pigment derivative having an N of 3 to 8 is 30% or less, or even if only one of the above-mentioned pigments is the pigment derivative (B), an organic pigment composition having remarkably high heat resistance is obtained.

The invention claimed is:

1. An organic pigment composition for color filters, comprising:
   a phthalocyanine pigment (A); and
   a pigment derivative (B) represented by General Formula (1):

General Formula (1)

[Chem. 1]

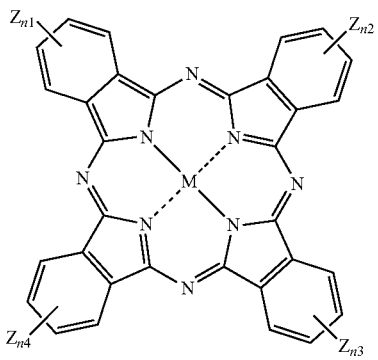

wherein in General Formula (1), M represents a metal which may have a substituent or 2H, Z represents a phthalimide alkyl group which may have a substituent, n1, n2, n3, and n4 represent the number of the substituent Z and each independently is an integer of 0 to 4, provided that when N=n1+n2+n3+n4, a relation of 1≤N≤8 is satisfied, a sum of the strength ratio of pigment derivatives having an N of 3 to 8 in field desorption ionization mass spectrometry is 30% or less of a sum of the strength ratio of pigment derivatives having an N of 1 to 8, a strength ratio of pigment derivative of N=2 in field desorption ionization mass spectrometry is 20% or more of a sum of the strength ratio of pigment derivatives having an N of 1 to 8, and a strength ratio of pigment derivative of N=5 is 0.7% or more and less than 5.1% of a sum of the strength ratio of pigment derivatives having an N of 1 to 8.

2. The organic pigment composition for color filters according to claim 1,
wherein in General Formula (1), a sum of the strength ratio of pigment derivatives having an N of 4 to 8 in field desorption ionization mass spectrometry is 15% or less of a sum of the strength ratio of pigment derivatives having an N of 1 to 8.

3. A method for producing the organic pigment composition for color filters according to claim 2 comprising:
a step of performing solvent salt milling of a mixture which includes crude phthalocyanine or the phthalocyanine pigment (A), the pigment derivative (B) represented by General Formula (1), a water-soluble inorganic salt, and a water-soluble organic solvent.

4. The method for producing the organic pigment composition for color filters according to claim 3,
wherein the mixture, which includes crude phthalocyanine or the phthalocyanine pigment (A), the pigment derivative (B) represented by General Formula (1), a water-soluble inorganic salt, and a water-soluble organic solvent, further includes an acryl resin.

5. A color filter comprising:
the organic pigment composition for color filters obtained by the method for producing an organic pigment composition for color filters according to claim 3.

6. A color filter comprising:
the organic pigment composition for color filters according to claim 2.

7. The organic pigment composition for color filters according to claim 1,
wherein M in General Formula (1) represents a monovalent to tetravalent metal which may have a substituent.

8. A method for producing the organic pigment composition for color filters according to claim 7 comprising:
a step of performing solvent salt milling of a mixture which includes crude phthalocyanine or the phthalocyanine pigment (A), the pigment derivative (B) represented by General Formula (1), a water-soluble inorganic salt, and a water-soluble organic solvent.

9. The method for producing the organic pigment composition for color filters according to claim 8,
wherein the mixture, which includes crude phthalocyanine or the phthalocyanine pigment (A), the pigment derivative (B) represented by General Formula (1), a water-soluble inorganic salt, and a water-soluble organic solvent, further includes an acryl resin.

10. A color filter comprising:
the organic pigment composition for color filters obtained by the method for producing an organic pigment composition for color filters according to claim 8.

11. A color filter comprising:
the organic pigment composition for color filters according to claim 7.

12. The organic pigment composition for color filters according to claim 1,
wherein 0.1 parts to 50.0 parts of the pigment derivative (B) represented by General Formula (1) are included per 100 parts of the phthalocyanine pigment (A) by mass.

13. A method for producing the organic pigment composition for color filters according to claim 12 comprising:
a step of performing solvent salt milling of a mixture which includes crude phthalocyanine or the phthalocyanine pigment (A), the pigment derivative (B) represented by General Formula (1), a water-soluble inorganic salt, and a water-soluble organic solvent.

14. The method for producing the organic pigment composition for color filters according to claim 13,
wherein the mixture, which includes crude phthalocyanine or the phthalocyanine pigment (A), the pigment derivative (B) represented by General Formula (1), a water-soluble inorganic salt, and a water-soluble organic solvent, further includes an acryl resin.

15. A color filter comprising:
the organic pigment composition for color filters according to claim 12.

16. A method for producing the organic pigment composition for color filters according to claim 1 comprising:
a step of performing solvent salt milling of a mixture which includes crude phthalocyanine or the phthalocyanine pigment (A), the pigment derivative (B) represented by General Formula (1), a water-soluble inorganic salt, and a water-soluble organic solvent.

17. The method for producing the organic pigment composition for color filters according to claim 16,
wherein the mixture, which includes crude phthalocyanine or the phthalocyanine pigment (A), the pigment derivative (B) represented by General Formula (1), a water-soluble inorganic salt, and a water-soluble organic solvent, further includes an acryl resin.

18. A color filter comprising:
the organic pigment composition for color filters obtained by the method for producing an organic pigment composition for color filters according to claim 17.

19. A color filter comprising:
the organic pigment composition for color filters according to claim 1.

20. A color filter comprising:
the organic pigment composition for color filters obtained by the method for producing an organic pigment composition for color filters according to claim 16.

* * * * *